United States Patent [19]

Fields

[11] Patent Number: 4,471,474

[45] Date of Patent: Sep. 11, 1984

[54] COUPLED WAVEGUIDE ACOUSTO-OPTIC HYDROPHONE

[75] Inventor: Joseph N. Fields, Thousand Oaks, Calif.

[73] Assignee: Hughes Aircraft Company, El Segundo, Calif.

[21] Appl. No.: 417,253

[22] Filed: Sep. 13, 1982

Related U.S. Application Data

[62] Division of Ser. No. 79,856, Sep. 28, 1979, abandoned.

[51] Int. Cl.³ .................... H04R 17/00; G01N 29/04
[52] U.S. Cl. .................................... 367/149; 73/655; 350/96.15
[58] Field of Search ............... 367/140, 141, 149, 153, 367/154; 350/96.12–96.15; 455/612, 614; 73/655

[56] References Cited

U.S. PATENT DOCUMENTS

| | | | |
|---|---|---|---|
| 3,753,157 | 8/1973 | Ash et al. | 350/96.13 |
| 3,850,503 | 11/1974 | Riseberg et al. | 350/96.13 |
| 4,035,058 | 7/1977 | Papuchon | 350/96.14 |
| 4,071,753 | 1/1978 | Fulenwider et al. | 367/149 |
| 4,087,156 | 5/1978 | Kao et al. | 350/96.15 |
| 4,185,884 | 1/1980 | McMahon | 350/96.14 |
| 4,193,130 | 3/1980 | Young et al. | 367/172 |
| 4,286,468 | 9/1981 | Altman | 73/655 |

OTHER PUBLICATIONS

*New Directional Coupler for Integrated Optics,* by Awacher et al., Journal of Applied Physics, vol. 45, No. 11, (Nov. 1971), pp. 4997–4999.

*Optical Switch and Modulator in Parallel Waveguides,* by E. G. Leam, IBM Tech. Disclosure Bulletin, vol. 17, No. 4, Sep. 1974, pp. 1210–1213.

*Primary Examiner*—Harold J. Tudor
*Attorney, Agent, or Firm*—Russell Ben Miller; William J. Bethurum; Anthony W. Karambelas

[57] ABSTRACT

Apparatus is provided for detecting the presence of acoustic signals which includes a laser source, and a detector coupled to opposite end of an acousto-optic transducer. The transducer may employ fiber optic waveguides, etched to allow evanescent coupling therebetween, and disposed within a flexible housing. Integrated and planar optic transducers are provided in various forms employing two integrated optic waveguide channels, two planar waveguides, or a planar waveguide and absorber combination. Each configuration is disposed within a flexible housing and the waveguides are separated from each other by a predetermined distance. Any flexing of the housing is transformed into a displacement of the waveguides relative to one another. The coupling between the waveguides is a very sensitive function of distance, and hence detection of variations in the energy coupled by the waveguides provides an indication of the presence of the acoustic signals.

3 Claims, 10 Drawing Figures

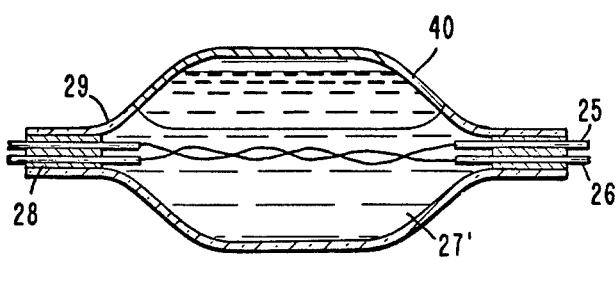
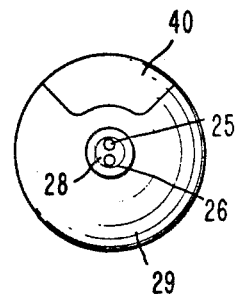
Fig. 4a.  Fig. 4b.
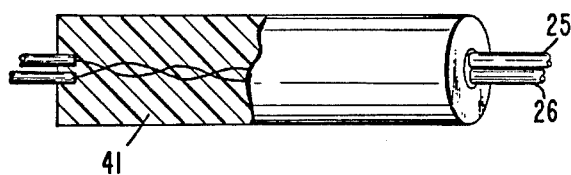
Fig. 5.
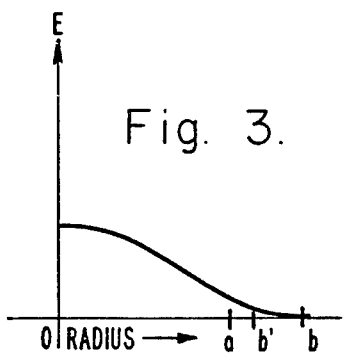
Fig. 3.
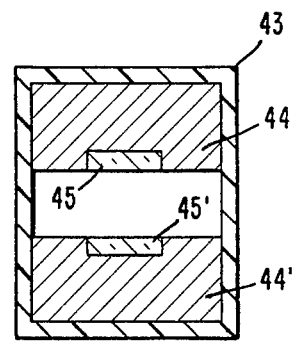
Fig. 6a.
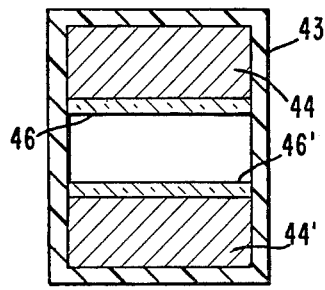
Fig. 6b.
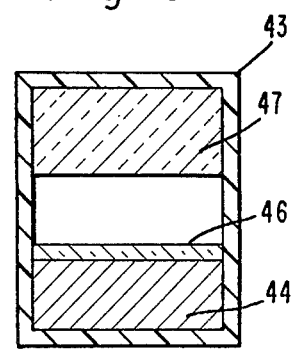
Fig. 6c.

COUPLED WAVEGUIDE ACOUSTO-OPTIC HYDROPHONE

This is a division of application Ser. No. 79,856 filed Sept. 28, 1979, now abandoned.

The present invention relates generally to hydrophones and more particularly to hydrophones which employ optical waveguides.

BACKGROUND

Heretofore, there has been much work related to development of hydrophones for use in sonar towed arrays, fixed coastal or deep water arrays, torpedo guidance systems, or the like. Piezoelectric transducers have been developed for use with these systems but they have a number of problems. The towed array system has on the order of 250 channels, and each transducer consumes power on the order of 25 watts per channel, resulting in approximately 6 kilowatts of power dissipated in the towed array. Furthermore, piezoelectric transducers are low efficiency devices at low acoustic frequencies, on the order of a few hundred hertz or below, and they exhibit a non-uniform response at these frequencies. Additionally, the systems are very costly and have reliability problems due to their complexity. Piezoelectric transducers are enclosed in a sealed, water-tight housing containing an oil. The transducers are adversely affected by water and may become defective if immersed in water. Thus the seal must be almost perfect for the transducers to perform properly in a water environment.

Because of the above mentioned difficulties with conventional detection systems, there has been interest in the development of fiber optic phase-modulated transducers. However, such transducers are sensitive to environmental factors, such as temperature changes, particularly at low frequencies. The phase response of the fiber optic materials to a temperature variation of 1° C. is larger than the response to a pressure change of 1 Pa (Pascal) by a factor of greater than $10^6$. Accordingly, temperature fluctuations and shifts are serious drawbacks to such phase-modulated systems.

Additionally, conventional hydrophone systems employ electrical conductors between the transducer elements and signal processor units, which result in electrical connection problems due to the deterioration of solder joints and loose connector pins. Crosstalk between adjacent channels and electromagnetic interference problems also affect performance of such conventional systems. Furthermore, many conventional hydrophone systems require the use of preamplifiers located at the transducer to provide sufficient signal strength for transmission to the signal processor. For an additional discussion of the drawbacks of conventional hydrophones see U.S. Pat. No. 3,831,137 for "Acousto-Optic Underwater Detector."

An article by S. K. Sheem et al. entitled "Single-mode Fiber-optical Power Divider: Encapsulated Etching Technique", Optics Letters, Vol. 4, No. 1, Jan. 1979 describes an optical coupler whose configuration is substantially the same as one embodiment of the present invention. The article particularly deals with the etching process required to prepare optical fibers and construct an optical coupler. The article neither discloses nor suggests the use of this coupler for the purposes of the detection of acoustic signals, or the like. In addition, only an optical fiber version of the coupler is disclosed.

The present invention is not limited to optical fibers, but may employ integrated or planar optics therein.

SUMMARY OF THE INVENTION

Accordingly, it is object of the present invention to provide an optical hydrophone which has less sensitivity to temperature variations than conventional phase-modulated hydrophones.

It is a further object of the present invention to provide an optical hydrophone which consumes substantially less power than conventional hydrophones and which is immune to crosstalk between channels and electromagnetic interference problems as found in conventional hydrophone systems.

In accordance with these and other objects of the present invention there is provided an optical hydrophone comprising a laser source and a detector coupled to opposite ends of an acousto-optic transducer. The transducer includes a flexible housing and a pair of optical waveguides having at least a portion thereof enclosed within the housing. The waveguides are disposed adjacent to one another and separated by a predetermined distance which allows coupling of laser light therebetween. The laser source is coupled to one end of one of the waveguides while the detector is coupled to the other end thereof.

One embodiment of the transducer employs fiber optic waveguides which are twisted around each other within the housing. The waveguides are etched in the twisted area and may be secured by means of a flexible potting compound, or the like, so as to fix the relative distance between the two waveguides. Accordingly, any flexing of the potting modulates the distance between the waveguides which provides for a greater or lesser amount (amplitude modulation) of light coupled between the waveguides. This modulation provides an indication of the presence of the acoustic signals.

Several embodiments provide for use of integrated optic waveguides instead of fiber optic waveguides. The integrated optic transducers may employ two integrated optic channel waveguides disposed in separate substrates and disposed adjacent and parallel to one another and separated by a predetermined distance. Another configuration uses two planar waveguides separated by a predetermined distance and a third employs a planar waveguide and an absorbing material similarily separated.

BRIEF DESCRIPTION OF THE DRAWINGS

The foregoing and other objects and features of the present invention may be more readily understood with reference to the following detailed description taken in conjunction with the accompanying drawings, wherein like reference numerals designate like structural elements, and in which:

FIG. 3 shows a graph of electric field versus radius for a typical single mode optical fiber;

FIGS. 4a and 4b show one embodiment of a transducer for use with the hydrophone of the present invention;

FIG. 5 shows a second embodiment of a transducer for use with the hydrophone of the present invention; and FIGS. 6a, 6b and 6c show cross-sectional views of three transducers for use with the present invention.

DETAILED DESCRIPTION OF THE INVENTION

Figure 1:
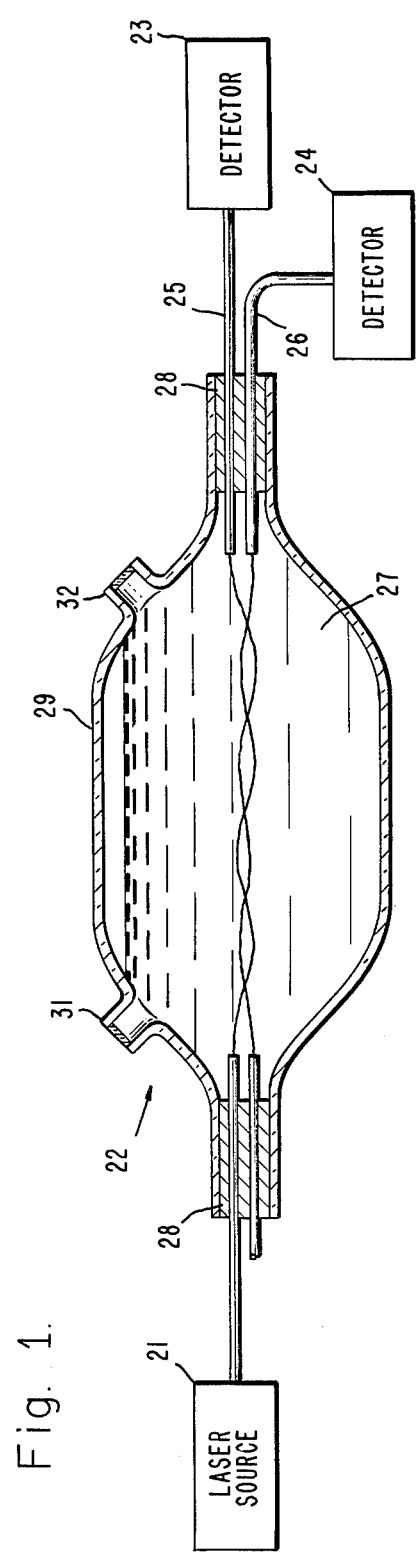
FIG. 1 shows one embodiment of the present invention and is illustrative in describing the procedure for making same.

Referring now to FIG. 1 there is shown an acousto-optic hydrophone made in accordance with the principles of the present invention. The hydrophone comprises a laser source 21, an acousto-optic transducer 22 and two detectors 23, 24, although in actual operation only one detector is required. The laser source 21 may be a helium neon or gallium arsenide laser, or the like, while the detectors may be a UDT Model 450 detector, or the like. The acousto-optic transducer 22 includes a housing 29, which may be made of quartz, or the like, in the form of a vial or flask having its opposite ends open. Also, inlet and outlet parts 31, 32 are provided in the side wall of the housing 29.

Two fiber optic waveguides 25, 26 are extended through the opposite ends of the housing and secured by means of a sealant 28, such as silicone resin, epoxy, or wax, or the like, so as to have a portion thereof secured within the housing 29. Additionally, the two waveguides 25, 26 are twisted around each other in that portion within the transducer 22. The laser source 21 is coupled to one end of one waveguide 25 while the two detectors 23, 24 are coupled to the waveguides 25, 26 at the opposite end thereof. Once the sealant 28 has hardened and secured the fiber optic waveguides 25, 26, an etching fluid 27, such as hydrogen fluoride, or the like, is flushed through the housing 29 by means of the inlet and outlet ports 31, 32. This etching fluid 27 etches the fiber optic waveguides 25, 26 in the twisted area as shown in FIG. 1.

Figure 2B:
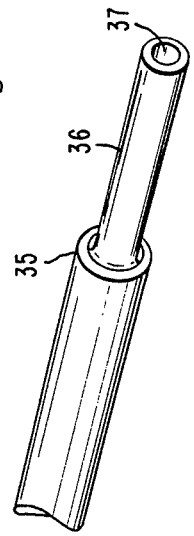
FIGS. 2a and 2b show fiber optic waveguides in unetched and etched conditions.
Figure 2A:
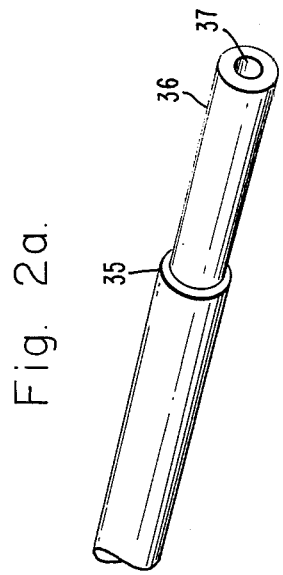

Referring to FIGS. 2a and b there is shown a typical fiber optic waveguide in the unetched and etched configurations, respectively. The waveguide is composed of an outer plastic sheath 35 used as a protective covering, a cladding section 36, which is comprised of fused quartz, or the like, and a core section 37 comprised of germania doped silica, or the like. The two sections 36, 37 shown in FIG. 2a insure the total internal reflection of the light provided thereto. In FIG. 2b the cladding section 36 is etched so as to be at a smaller diameter than in FIG. 2a. The reduced cladding section 36 allows the light to radiate beyond the confines of the waveguide which in turn allows for coupling of the light to similarly configured, closely spaced waveguide.

A better understanding of the coupling phenomenon, known as evanescent coupling, may be obtained with reference to FIG. 3, which shows a graph of electric field (E) versus waveguide radius for a typical single mode fiber. The core diameter is "a" and the cladding diameter is "b". The electric field is generally a trigonometric function within the core area, while in the cladding area the field is a decaying exponential function. Accordingly, by etching a portion of the cladding so that its diameter is now "b'", the electric field is now such that it is extended outside the waveguide, and hence the light may couple to a second similarly configured, closely spaced waveguide. Furthermore, the power coupled to the second waveguide is given by the expression $P_2(z) = P_1(z=0) \sin^2 kz$, where $P_2(z)$ represents the power in the second waveguide, $P_1(z=0)$ is the power in the first waveguide at a particular known position, z is the distance along the waveguide, and k is a coupling coefficient. The coupling coefficient is a very sensitive function of distance, of which the present invention takes advantage.

Referring again to FIG. 1, the waveguides 25, 26 are etched in the following manner. The laser source 21 provides light to the one waveguide 25 which is detected by the detector 23. The detector 24 is coupled to the waveguide 26 at an end opposite the laser source 21. Initially, the waveguide 25, 26 are in the unetched condition. Once the etching process is in operation, the detectors 23, 24 are monitored until a predetermined amount of coupling is observed in the second waveguide 26. This is the indication that the etching process is complete, and accordingly, the etching fluid is drained from the housing 29 and the waveguides 25, 26 are rinsed with water, or the like. The etching fluid 27 is then replaced by an index matching fluid, such as mineral oil, glyceryn, or the like, which enhances the coupling of light between the waveguides 25, 26. A further understanding of this process may be found in the article by S. K. Sheem et al, entitled "Single-mode Fiber-optical Power Divider: Encapsulated Etching Technique", Optics Letter, Vol. 4, No. 1, Jan. 1979.

Referring now to FIGS. 4a and b, there is shown a cross-sectional view and an end view of a completed transducer 22. The transducer is substantially the same as that shown in FIG. 1, but the housing 29 is modified in the area where the inlet and drain ports 31, 32 are located. This area has been replace by a flexible membrane 40, such as flexible butyl rubber, or the like. In addition, an index matching fluid 27', such as mineral oil, or the like, has been disposed within the housing 29. The index matching fluid 27' is primarily used to enhance the coupling of light between the waveguides 25, 26. Relative motion of the membrane 40 causes relative motion between the waveguides 25, 26 which provides a detectible change in the coupling signal.

Referring now to FIG. 5, there is shown another embodiment of a transducer for use with the present invention. The transducer is substantially the same as that of FIG. 4; however, the waveguides 25, 26 are completely encased in a flexible casing 41, such as silicone resin, or the like. The casing 41 should be both flexible and compressible to allow for the modulation of the distance between the waveguides 25, 26 therein. The relative size of the transducer may be on the order of one inch in diameter and two inches in length.

Referring now to FIG. 6, there are shown three embodiments of a transducer for use in the present invention which may incorporate integrated or planar optics instead of fiber optics. The use of integrated or planar optics eliminates the etching process and provides for more accurate alignment and spacing between the waveguides.

FIG. 6a shows a transducer including a flexible housing 43, two substrates 44, 44' having integrated optic waveguide channels 45, 45' disposed therein. The waveguide channels 45, 45' are disposed adjacent and parallel to one another and separated by a predetermined distance. In general the flexible housing 43 may be comprised of butyl rubber, or the like, and may enclose a volume of about one cubic inch. The substrate 44, 44' may be comprised of lithium niobate, while the integrated optic waveguide channels, 45, 45' may be comprised of titanium diffused into lithium niobate. The waveguide channels 45, 45' are roughly 50 microns wide and on the order of 2 to 5 microns in depth, while the predetermined distance therebetween is generally on the order of 1 to 2 microns. The substrate 44, 44' may also be comprised of glass, such as fused quartz, or the like, while the waveguide channels 45, 45' may be comprised of a glass surface sputtered on top of the substrate material. A glass such as Corning 7059 glass may be used for this purpose. FIG. 6b provides for planar waveguides 46, 46' such as the glass or lithium niobate compositions mentioned hereinabove, deposited on the surfaces of the substrates 44, 44'. FIG. 6c shows the use of a planar waveguide 46 and an oppositely disposed absorbing material 47. For instance, the absorber 47 may be blue glass if, for instance, a helium neon laser were used as the laser source 21, and a glass waveguide is used opposite thereto.

Thus, there has been described an optical hydrophone system including a variety of optical transducers for use therewith, which is less sensitive to temperature variation due to the amplitude-modulated nature of the hydrophone. Additionally, the hydrophone consumes substantially less power, is generally immune from crosstalk between channels and electromagnetic interference problems generally associated with conventional hydrophones, due to the optical nature of the system.

It is to be understood that the above-described embodiments of the invention are merely illustrative of the many possible specific embodiments which represent applications of the principles of the present invention. Numerous and varied other arrangements may readily be devised in accordance with these principles by those skilled in the art without departing from the spirit and scope of the invention.

I claim:

1. An optical hydrophone for detecting the presence of applied acoustic signals, said hydrophone having a transducer comprising:

a flexible housing;

first and second integrated optical means positioned within said housing said first and second integrated optical means each having a substrate having a planar face and respectively having first and second integrated optical waveguides formed in said faces, each of said optical means being separately mechanically coupled to said housing and having said respective faces disposed parallel to and facing one another , a light source coupled to said first integrated optical waveguide, a detector coupled to said second integrated optical waveguide, so that acoustic signals cause flexing of said housing to change the distance and therefore the optical coupling between said first and second integrated optical waveguides to provide an optical signal from an acoustic input.

2. An optical hydrophone for detecting the presence of applied acoustic signals, said hydrophone having a transducer comprising:

a flexible housing;

first and second integrated optical means positioned within said housing, said first and second integrated optical means each comprising a substrate selected from the group consisting of fused quartz and lithium niobate and each substrate having a waveguide channel formed therein of waveguide material selected from the group consisting of titanium and glass such that each said waveguide channel defines an exposed planar surface with said respective planar surfaces disposed parallel to and facing one another, said integrated optical means each being separately mechanically coupled to said housing, a light source coupled to said first integrated optical waveguide, a detector coupled to said second integrated optical waveguide, so that acoustic signals cause flexing of said housing to change the distance and therefore the optical coupling between said first and second integrated optical channels to produce an optical signal from the acoustic input.

3. An optical hydrophone which detects the presence of applied acoustic signals, said hydrophone comprising:

a flexible housing;

first and second integrated optical substrates spaced from one another within said housing and separately secured to said housing, said substrates respectively carrying first and second integrated optical waveguides on the face of said substrates for providing coupling of light between said first and second integrated optical waveguides, said first and second integrated optical substrates being separately mechanically coupled to said flexible housing and having said respective first and second optical waveguides disposed parallel to and facing one another;

a laser light source coupled to said first integrated optical waveguide;

a detector coupled to said second integrated optical waveguide;

whereby acoustic signals cause flexing of said housing which modulates the distance between said first and second integrated optical waveguides causing variations in the coupling of light therebetween, the variations being detected by said detector to provide an indication of the acoustic signals.

* * * * *